Sept. 11, 1956  W. J. KUNZ, JR., ET AL  2,762,194
SYSTEM FOR SPEED TEMPERATURE SCHEDULING
OF GAS TURBINE ENGINES
Filed Oct. 9, 1951  2 Sheets-Sheet 2

INVENTOR.
WILLIAM J. KUNZ JR.
WARNER C. WINTRODE
BY
Cecil D Arens
ATTORNEY

# 2,762,194

SYSTEM FOR SPEED TEMPERATURE SCHEDULING OF GAS TURBINE ENGINES

William J. Kunz, Jr., and Warner C. Wintrode, South Bend, Ind., assignors to Bendix Aviation Corporation, South Bend, Ind., a corporation of Delaware Application October 9, 1951, Serial No. 250,454

17 Claims. (Cl. 60—39.28)

This invention relates to an electrical system capable of establishing a reference signal which may be controlled as a function of a variable condition.

The electrical system of this invention is illustrated in connection with electronic control apparatus for use on a gas turbine engine as shown and described in the application of Paul P. Stockinger, Serial No. 228,867, filed May 29, 1951, now Patent No. 2,689,455 (common assignee).

In engines of the gas turbine types, there exists during certain periods of engine operation, a condition known as surge or compressor stall. The location and magnitude of the surge region are influenced by the engine inlet air temperature. An engine cannot be operated in this surge region for any period of time without damaging itself. Since surge and/or stall, are characteristics of practically all gas turbine engines, some form of control must be provided for circumventing these areas during engine operation; otherwise serious limitations would be imposed upon any aircraft into which these engines are built.

It is, therefore, an object of this invention to provide an electrical system capable of establishing two signals, one of which may be modified as a function of a variable condition.

Another object of the invention resides in the provision of an electrical system having means for establishing first and second signals, one of which represents a reference condition and the other of which represents a deviation from said reference condition, with means for connecting one or the other of said signals to an external utilization circuit, and an apparatus for modifying one of said signals as a function of a variable condition.

A still further object of the invention resides in the provision of means for establishing a signal which is to be modified by a first variable condition and controlled as a function of a second variable condition.

Another important object of the invention lies in the provision of an electrical system wherein two signals are produced, one of which is connected to the output of the system under one set of conditions and the other of which is connected to the output of said system under another set of conditions, with means in the system for modifying one of said signals.

The above and other objects and features of the invention will be apparent from the following description of the apparatus taken in connection with the accompanying drawings which form a part of this specification and in which.

Figure 1:
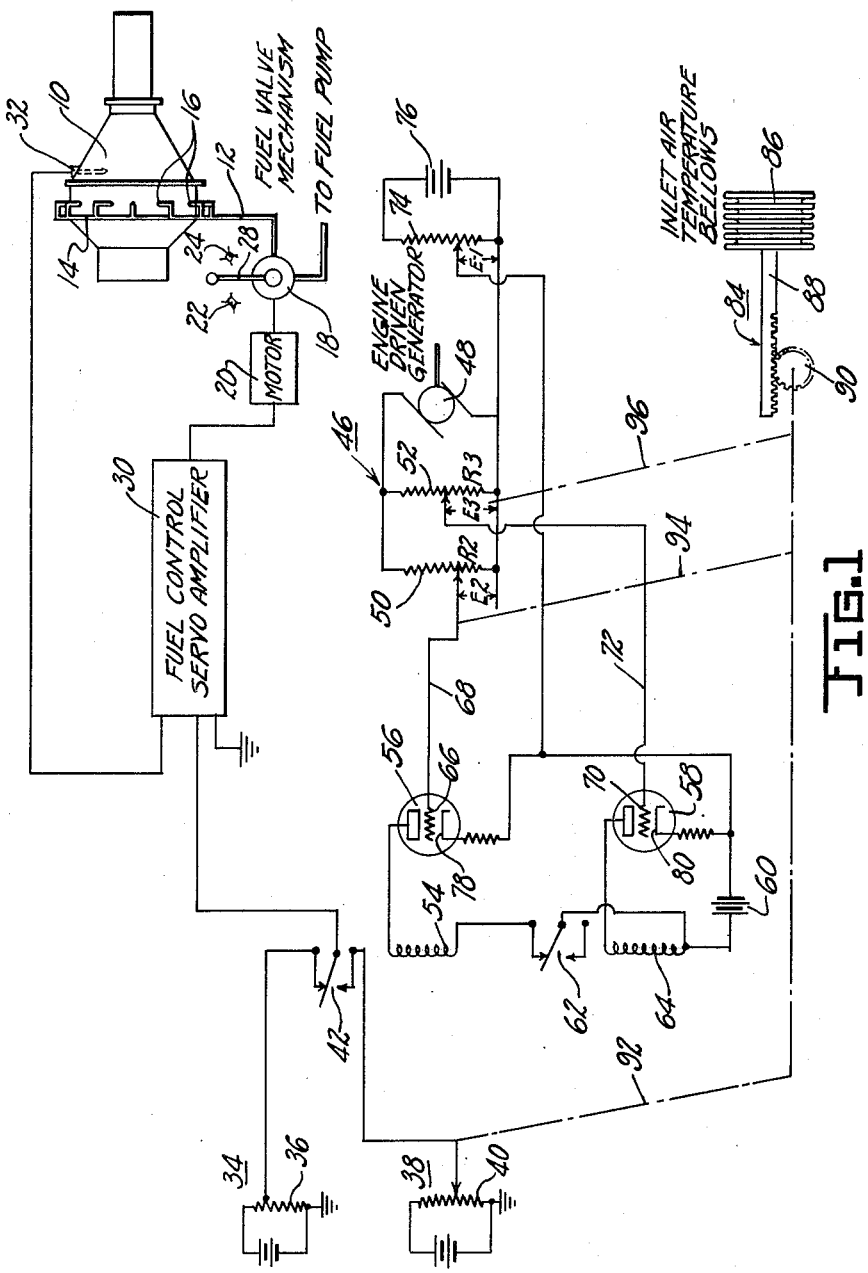
Figure 1 is a wiring diagram of the device of the invention shown associated with a gas turbine engine.

Referring now to Figure 1 for a detail description, the reference numeral 10 designates a gas turbine engine, with which the invention is associated. A pipe line 12 supplies fuel to a main fuel manifold 14, provided with a plurality of nozzles 16, communicating with associated chambers or burners, not shown. A fuel valve 18 is located in the pipe line 12 between a source of fuel, not shown, and the manifold 14. The valve 18 is connected to a two phase motor 20, which controls valve movement between mechanical stops 22 and 24. An arm 26 is carried by a movable element of the valve so as to engage the stops 22 and 24 when moved to extreme positions in opposite directions, to thereby confine valve movement within designated limits.

Reference numeral 30 is a fuel control servoamplifier of the type described and claimed in the aforementioned Patent No. 2,689,455. It should be understood, however, that it is within the spirit of this invention to use the same with any type of electronic servocontrol mechanism which operates with the aid of a reference signal for determining an engine operating condition, for example, engine operating temperature. A thermocouple 32, located in the engine 10, senses actual engine temperature. The temperature sensed by the thermocouple is converted into a voltage which is fed into the servoamplifier 30. This converted voltage is compared with a reference voltage to thereby determine whether the valve 18 shall move in a direction to increase or decrease the fuel to the engine.

The invention herein described and claimed is primarily concerned with establishing a particular reference signal for use when one set of engine conditions prevails, and another reference signal when a different set of engine conditions exists. The electrical system of the invention comprises means 34, including a voltage divider 36, capable of producing a signal representing a reference condition, means 38, including a voltage divider 40, capable of producing a signal representing a desirable deviation from said reference condition, produced by the means 34. These signals created by means 34 and 38, actually represent temperature conditions allowable, in an engine of the gas turbine type, during periods of acceleration, and will be hereinafter described in more detail in connection with Figures 2 and 3.

Means is provided for connecting one or the other of said signals, established by potentiometers 36 and 40, to an external utilization circuit. In the present illustration this external circuit is the fuel servoamplifier 30. The means referred to comprises a relay or switching device 42, which is made responsive to a variable condition, such for example, as engine speed, and a mechanism 46, which senses a variable condition. The switching device or relay 42 is normally biased upwardly, as shown, connecting means 34 to the fuel control servoamplifier 30. Energization of the relay coil 54 connects the means 38 to the amplifier 30. It is a function of this mechanism 46, which embraces an engine driven generator 48 and potentiometers 50 and 52, connected in parallel to the generator output, to develop a voltage proportional to engine speed, which speed condition is a variable. The winding 54, of the switching device is connected in a control circuit having tubes 56 and 58. The plate circuits of these tubes are connected in parallel to receive current from a battery 60. Winding 54 and circuit interrupter 62 are arranged in series in the plate circuit of the tube 56. The circuit interrupter or relay 62 is provided with a winding 64 arranged in the plate circuit of the tube 58. The relay is normally closed, as shown, but openable upon energization of the winding 64. The tube 56 has a grid 66 and a connection 68 from the grid to the potentiometer 50 of the mechanism 46. The tube 58 has a grid 70 and a connection 72 from the grid to the potentiometer 52 of said mechanism. A potentiometer 74, connected across a battery 76, picks off a potential $E_1$ which is impressed on cathode 78 of the tube 56 to provide a bias on the grid 66 through a portion of resistor $R_2$. The potentiometer 50 selects a potential $E_2$ which is applied to the grid 66 in a manner which will reduce the bias established by $E_1$. So long as $E_2-E_1$ is a sufficiently negative value, tube 56 will be cut off and no plate current will flow through the winding 54. However, when $E_2-E_1$ is positive the grid of tube 56 takes on a positive potential, thus causing plate current to flow through the winding 54, actuating the device 42. Having established a bias on the tube 56 with $E_1$ it is obvious that the engine speed at which it is desired to close this relay 42 can be selected by choosing the proper value of $E_2$.

The potentiometer 74 also applies a potential $E_1$ to cathode 80 of the tube 58. $E_1$ biases the grid 70 through a portion of resistor $R_3$. The potentiometer 52 selects a potential $E_3$, which is impressed on the grid 70 to reduce the bias $E_1$. With $E_3-E_1$, a sufficiently negative value, tube 58 will be cut off and no plate current will pass through winding 64. When $E_3-E_1$ is a positive value the tube 58 will conduct, thus energizing the winding 64, causing the circuit interrupter 62 to open the plate circuit of the tube 56.

In gas turbine engines of the type herein disclosed it is desirable to vary the engine fuel supply in accordance with the inlet air temperature of the engine. This is done electrically in this case by modifying the signal fed into the external circuit. This function is performed by apparatus 84, comprising a bellows 86, rack 88, fixed thereto, and pinion 90, with which the rack meshes. Connections 92, 94, and 96 to potentiometers 40, 50 and 52 respectively move the wiper arms in accordance with variations in engine inlet air temperatures. It will be noted that this apparatus, which senses a variable condition of inlet air temperature, actually changes the preselected engine speed values picked off from the potentiometers 50 and 52, thus changing the time of connecting the signals to the external circuit, as well as the duration or range between cut in and cut out. This action will be further explained in connection with Figures 2 and 3. This apparatus also functions to modify the signal selected by the potentiometer 40, thereby selecting different constant temperature acceleration curves, see Figure 2.

Figure 2:
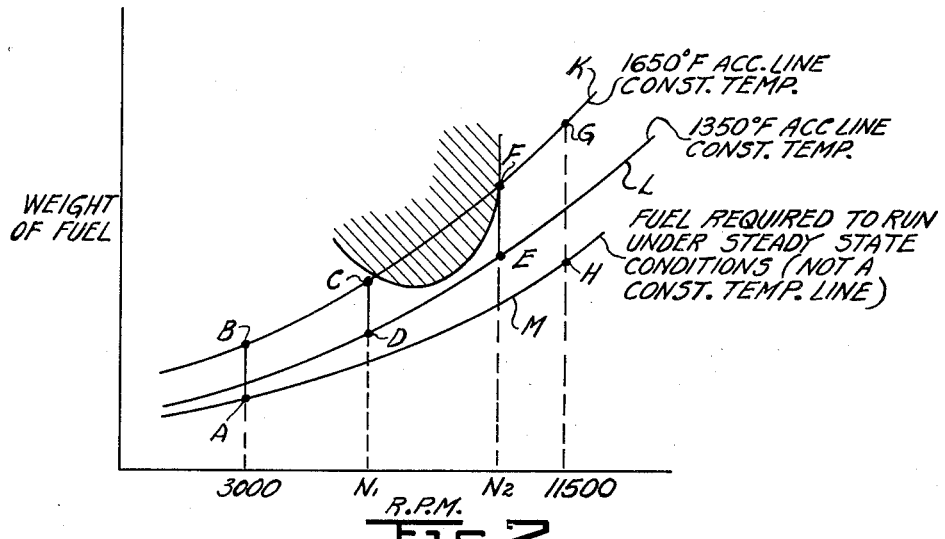
Figure 2 is a family of curves representing gas turbine engine characteristics.
Figure 3:
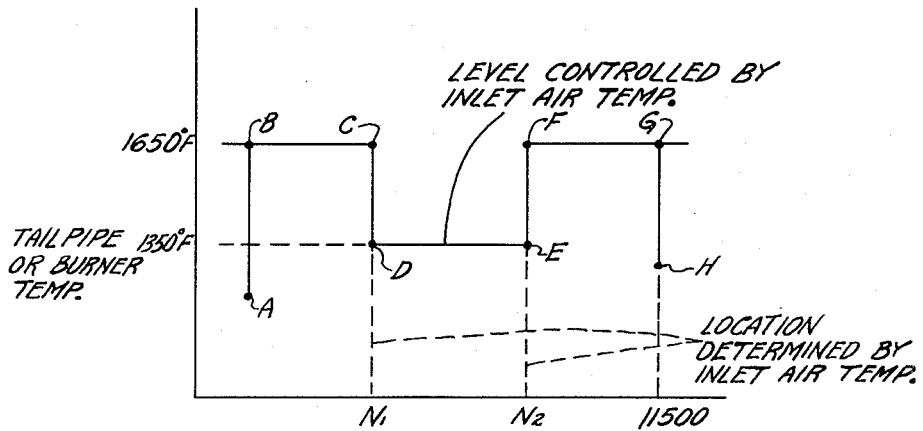
Figure 3 is a curve illustrating the wave form of an output signal developed by the novel means shown herein.

Each type of engine has its own characteristics and the curves of Figures 2 and 3 are for a particular engine. It is a purpose of the invention herein disclosed to provide electrical signals of predetermined values for application at appropriate times to amplifier 30 for controlling the supply of fuel to the engine in a manner to operate the same at the optimum point at all times.

Figures 2 and 3 are used for the express purpose of presenting graphically the problems involved in controlling fuel to gas turbine engines, and to show how these problems can be met with the aid of the electrical apparatus of the invention. A thorough and comprehensive discussion of the problem of surge can be found in the abundance of literature and text books now available.

An analysis and discussion of the curves of Figure 2 will serve to clarify the problem of surge and show how it can be avoided electronically by setting up manufactured signals which follow predetermined curves. Curves K and L are constant temperature acceleration lines and are derived by plotting weight of fuel versus engine R. P. M. This data is obtained from actual engine tests made for the purpose of determining the boundaries of the surge area to be circumvented. From tests made on the engine herein considered it was determined that an engine acceleration temperature of 1650° F. is desirable. It will be observed, however, that if fuel is scheduled along curve K it will lead into the surge region, shown shaded, which is objectionable from the standpoint of engine operation. It is, therefore, necessary to select a constant temperature acceleration curve which will circumvent this region. Such a curve is exemplified in curve L which represents 1350° F. That is, if the engine acceleration temperature is reduced to 1350° F. at point C on the curve K the fuel required will be reduced to point D on the new acceleration curve L, this will obviously skirt the surge region. Unless a different acceleration temperature is selected fuel will be scheduled along curve L until the selected speed is reached, after which a steady state condition will be attained, along curve M. If, for example, the engine speed selected were 11,500 R. P. M. a vertical line passing through this value on the abscissa will intersect the steady state curve M at point H, thus determining the fuel required.

However, instead of scheduling fuel along the 1350° F. constant temperature acceleration curve as might have been done after passing out from under the surge region, it is more desirable to schedule fuel at the higher acceleration temperature, namely 1650° F. Since point E on the curve L is out from under the surge region scheduling at the higher temperature is resumed at this point. Fuel is now scheduled on the 1650° F. constant temperature curve between F and G. Assuming that an engine speed of 11,500 R. P. M. was selected the weight of fuel supplied to the engine will drop from point G on the curve K to point H on the curve M when a steady state condition is reached. These constant temperature reference conditions or signals are selected by the potentiometers 36 and 40, the former representing a reference temperature of 1650° F., and the latter representing a temperature of 1350° F., which is a deviation from the reference temperature, for circumventing the surge region.

Since surge for a particular engine occurs at definite speeds with a given engine inlet air temperature, it is evident that engine speed can be utilized for switching from curve K to curve L, and vice versa. This is achieved by the engine driven generator 48 which produces a voltage proportional to engine speed.

The curve of Figure 3 is plotted with engine temperature as the ordinate and engine R. P. M. as the abscissa. The curve forms a basis for the construction of circuitry which will produce a control signal that follows the pattern in Figure 3. That is, after establishing an engine tailpipe temperature vs. engine R. P. M. curve that will avoid the surge region, an electrical system is constructed which will produce an output signal which conforms to that curve. The data used in plotting this curve is obtained by the engine manufacturer for use in constructing a fuel mechanism that will meet the engine requirements. In the instant case it has been ascertained that 1650° F. is the maximum constant tailpipe acceleration temperature allowable and this must be reduced to 1350° F. (under some particular ambient condition) when engine R. P. M. reaches a value $N_1$, point C on the maximum temperature curve K. This point may be determined in test by holding the temperature of the engine at some maximum operating temperature, say 1650° F., and feeding fuel to the engine to maintain that temperature as engine speed is increased, observing the speed at which the engine starts to surge and cutting back the fuel supply accordingly, thus sliding from C on curve K, to D on curve L. Another tailpipe temperature, say 1350° F., which will avoid the surge region, is then selected. This new temperature is held constant and fuel fed into the engine to maintain this temperature as engine speed is increased. At some speed $N_2$, an increase in fuel will cause the tailpipe temperature to rise from E to F, the maximum tailpipe temperature allowable. From here on, fuel is supplied to maintain a temperature of 1650° F. with increased speed. If a maximum engine speed of 11,500 R. P. M. were selected, fuel is added in increasing quantities until point G on the 1650° F. curve is reached, at which time the fuel required to maintain this selected speed is reduced to that shown at point H. Although the points C and F may be considered as speed points, inasmuch as these points determine the operation of relays 42 and 62, actually the location of the points are determined by inlet air temperature. With a given engine inlet air temperature (ambient temperature) and with the engine tailpipe reference temperature held at 1650° F., an engine R. P. M. of $N_1$ must be reached before shifting to point D on the 1350° F. tailpipe temperature curve. This 1350° F. curve is then traversed from D until an engine R. P. M. of $N_2$ has been attained, point E on the curve. The relay 62 is now energized, thus causing a shift from E, on the 1350° F. reference temperature curve, up to point F on the 1650° F. line. The engine is now operated on this 1650° F. tailpipe temperature line (constant temperature acceleration line in Figure 2). In view of the foregoing, it will be observed that points C, D, E, and F are all a function of inlet air temperature. The 1350° F. reference temperature is selected by the means 38 and adjusted to the level D—E by apparatus 84, which is a function of inlet air temperature.

Operation of the system, which is entirely automatic, is as follows: Assume that the engine is operating at A on the steady state curve M (Figure 2), at a speed of 3000 R. P. M., when it is decided to accelerate the engine to 11,500 R. P. M. The selection of an engine speed of 11,500 R. P. M., through a throttle mechanism, not shown, connects the reference signal, which is developed by means 34, and representing a tailpipe temperature of 1650° F., into the servo amplifier 30. The fuel valve 18 is immediately opened, thus increasing the fuel from A to point B on the 1650° F. constant acceleration curve. This curve is now traversed to point C as engine speed increases to $N_1$. The speed of the engine is reflected by a potential proportional to speed and appearing on the grid 66. The tube 56 is so biased that at a speed of $N_1$ the potential on the grid 66 becomes sufficiently positive, to cause the tube to conduct. Current through the winding 54 actuates the device 42, to thereby connect the external utilization circuit, or amplifier 30, to the means 38, which produces a signal representing a different constant temperature acceleration. In view of the reduction in engine temperature operation, the fuel required is decreased to point D on the 1350° F. curve. This curve is traversed from D to point E where the engine speed is $N_2$. With an engine speed of $N_2$ the potential on the grid 70, of the tube 58, becomes sufficiently positive, to cause current to flow in the plate circuit of the tube and in the winding 64, thus actuating the device 62 and interrupting the passage of current through winding 54. This action allows relay 42 to swing to its normally closed position, shown in the drawing, connecting means 34 to the external utilization circuit. In view of the higher acceleration temperatures permitted on the curve K the fuel required is increased from E on curve L, to point F on the curve K. Acceleration is now along curve K from point F to G, where 11,500 R. P. M. is reached, at which time the fuel necessary for continued engine operation at 11,500 R. P. M. decreases to the point H, on the steady state curve M.

Although only one form of circuitry is shown, it is obvious to persons skilled in the art that numerous refinements can be made which will provide any required degree of sensitivity and stability without changing the spirit and intent of this invention.

Although the invention has been described in connection with certain specific embodiments, the principles are susceptible of numerous other applications that will readily occur to persons skilled in the art.

Having thus described the various features of the invention, what we claim as new and desire to secure by Letters Patent is:

1. An electrical system comprising means for developing a signal representing a first condition, switching means for connecting the signal to an external utilization circuit, said last named means including an electrical coordinating device controlled by predetermined values of a second condition, a mechanism for sensing said second condition, and means for automatically varying the values of said second condition.

2. An electrical system comprising means for developing a signal representing a first condition, switching means for connecting the signal to an external utilization circuit, said last named means including an electrical coordinating device controlled by a second condition, a mechanism for sensing said second condition, and means for varying the condition sensed as a function of a third condition.

3. An electrical control system comprising means for producing a signal representing a preselected temperature condition, switching means for connecting the signal to an external utilization circuit, said last named means including an electrical coordinating device controlled as a function of a second condition, a mechanism for sensing said second condition, and means for modifying said signal as a function of a third condition.

4. In an electrical control system for a gas turbine engine, the combination of, means for establishing a signal representing a condition of engine operating temperature, means for connecting said signal to an external utilization circuit and including a device controlled as a function of engine speed, and means operatively connected to said first named means for modifying said signal as a function of engine inlet air temperature.

5. In an electrical control system for a gas turbine engine, the combination of means for establishing a signal representing a preselected condition of engine operating temperature, means controlling the existence of said signal in the output of said system as a function of engine speed within a predetermined speed range, said last named means including a speed sensing mechanism, and means for changing the value of the sensed speed as a function of engine inlet air temperature.

6. An electrical system comprising means for producing a signal representing a reference temperature, means for producing a signal representing a second temperature different from said reference temperature, means for connecting one or the other of said signals to an external utilization circuit, said last named means including a device responsive to predetermined values of a variable condition, a mechanism for sensing said variable condition and applying the same to said device, and means for changing the predetermined values.

7. An electrical system comprising means for producing a signal representing a reference temperature, means for producing a signal representing a second temperature different from said reference temperature, means for connecting one or the other of said signals to an external utilization circuit, said last named means including a device responsive to predetermined values of a variable condition, a mechanism for sensing said variable condition, a control circuit including said device, and a pair of output tubes arranged in the control circuit so that one of the tubes is conductive at one predetermined value of said variable condition and the other of said tubes is conductive at another predetermined value, each of said tubes being provided with a grid connected to said variable condition sensing mechanism.

8. An electrical system comprising means for producing a signal representing a reference condition, means for producing a signal representing an engine operating condition different from said reference condition, means for connecting one or the other of said signals to an external utilization circuit, said last named means including a device responsive to predetermined values of a variable condition, a mechanism for sensing said variable condition, a control circuit including said device, a pair of output tubes arranged in the control circuit so that one of the tubes is conductive at one predetermined value of said variable condition and the other of said tubes is conductive at another predetermined value, each tube being provided with a grid and a connection from the grid to said mechanism, and apparatus for changing said predetermined values as a function of a variable parameter.

9. An electrical system as defined in claim 8 wherein said apparatus is connected to said second named means for modifying the signal representing an engine operating condition different from said reference condition.

10. An electrical system comprising means producing a signal representing a reference condition, means producing a signal representing an engine operating condition different from said reference condition, means including a variable condition sensing mechanism for connecting one or the other of said signals to an external circuit, and an apparatus for sensing another variable condition and connected to said second named means for modifying said signal produced thereby.

11. An electrical system comprising a signal, means for connecting said signal to an external utilization circuit including a variable condition sensing mechanism, two output tubes, one of which is conductive when the condition sensed by said mechanism is one value and the other of which is conductive when the condition sensed is another value, and means for changing the values which render said tubes conductive.

12. An electrical system comprising means for producing a signal, means for connecting said signal to an external utilization circuit including a variable condition sensing mechanism, a device energizable between two values of the condition sensed to thereby connect said signal to the external circuit, and means for modifying said signal and for changing the two values of said condition.

13. An electrical system comprising means for producing first and second signals, means for connecting one or the other of said signals to an external circuit, said last named means including a temperature sensing mechanism, a device responsive to preselected values of the sensed temperature, and means for changing said preselected values.

14. An electrical system comprising means for producing first and second signals, means for connecting one or the other of said signals to an external circuit, said last named means including a variable condition sensing mechanism, a device responsive to preselected values of said condition, means for changing said preselected values, and means for modifying one of said signals.

15. An electrical system comprising means for producing a signal representing a reference condition, means for producing a signal representing an engine operating condition different from said reference condition, means for connecting one or the other of said signals to an external utilization circuit, said last named means including a control circuit having two output tubes, a switching device for connecting the signals to said external circuit and energized by current in the plate circuit of one of said tubes, a relay in the plate circuit of said one tube and controlled by current in the plate circuit of said other tube, a mechanism for sensing a variable condition, said mechanism including a generator for creating a potential proportional to generator speed, two potentiometers connected in parallel with the generator output, a grid for said one tube having a connection to one of said potentiometers, a grid for the other tube having a connection to the other potentiometer, and means for applying a predetermined bias to said grids.

16. In an electrical system of the class defined in claim 15 wherein a condition sensing apparatus is connected to said potentiometers for varying the generator potential applied to said tubes.

17. In an electrical system of the class defined in claim 15 wherein a condition sensing apparatus is connected to said second named means for modifying said signal produced thereby as a function of inlet air temperature.

References Cited in the file of this patent

UNITED STATES PATENTS

| | | |
|---|---|---|
| 2,109,222 | Ryder | Feb. 22, 1938 |
| 2,382,847 | Baumann | Aug. 14, 1945 |
| 2,439,750 | Nisbet et al. | Apr. 13, 1948 |
| 2,464,629 | Young | Mar. 14, 1949 |
| 2,542,499 | Fortescue | Feb. 20, 1951 |
| 2,581,275 | Mock | Jan. 1, 1952 |
| 2,581,276 | Mock | Jan. 1, 1952 |
| 2,662,372 | Offner | Dec. 15, 1953 |

FOREIGN PATENTS

| | | |
|---|---|---|
| 626,045 | Great Britain | July 8, 1949 |